United States Patent [19]
Dyott

[11] Patent Number: 5,552,887
[45] Date of Patent: Sep. 3, 1996

[54] FIBER OPTIC ROTATION SENSOR OR GYROSCOPE WITH IMPROVED SENSING COIL

[75] Inventor: Richard B. Dyott, Oak Lawn, Ill.

[73] Assignee: Andrew Corporation, Orland Park, Ill.

[21] Appl. No.: 418,946

[22] Filed: Apr. 7, 1995

[51] Int. Cl.[6] .................................................. G01C 19/72
[52] U.S. Cl. .......................................... 356/350; 242/470
[58] Field of Search ........................... 356/350; 242/4 R, 242/7.01, 360, 470; 385/12, 14; 250/227.19, 227.27

[56] References Cited

U.S. PATENT DOCUMENTS

| | | |
|---|---|---|
| 4,752,043 | 6/1988 | Heinzer .................................. 242/18 G |
| 4,856,900 | 8/1989 | Ivancevic ................................ 356/350 |
| 5,405,485 | 4/1995 | Henderson et al. . | |

OTHER PUBLICATIONS

D. M. Shupe, "Thermally Induced Nonreceiprocity In The Fiber–optic Interferometer, " *Optical Society of America* (Reprinted by permission of the publisher from Applied Optics), vol. 19(5), 654–655 (1980).

*Primary Examiner*—Samuel A. Turner
*Attorney, Agent, or Firm*—Arnold, White & Durkee

[57] ABSTRACT

A fiber-optic gyro includes a source of light and a coil of optical fiber with multiple turns. The coil is rotatable about an axis of sensitivity and optically couples light from the source to the coil to create counter-propagating light beams within the coil. The counter-propagated light beams produce an output signal indicative of the coil rotation rate, which is fed to a photodetector. The multiple turns of the coil vary in size on both sides of the mid-point of the fiber that forms the coil, and these multiple turns are collapsed in the direction of the axis of the coil.

36 Claims, 10 Drawing Sheets

FIBER OPTIC ROTATION SENSOR OR GYROSCOPE WITH IMPROVED SENSING COIL

FIELD OF THE INVENTION

The present invention generally relates to fiber-optic rotation sensors or gyroscopes.

BACKGROUND OF THE INVENTION

Fiber-optic rotation sensors or gyros, as they are commonly called, are increasingly being used for detection of rotation, particularly in navigation systems such as those used in motor vehicles, aircraft, and spacecraft, where accurate and reliable sensing of inertial rotation is highly critical.

In a typical fiber-optic gyro, light from a laser or some other suitable light source is divided into two separate beams by means of a beam splitter and then coupled into the two ends of a multi-turn coil of optical fiber, typically of the single-mode type. Light emerging from the two fiber ends is combined by the beam splitter and detected by a photodetector.

Rotation sensing is typically accomplished by detection of a rotationally induced phase shift, commonly referred to as the "Sagnac phase shift," between the light beams propagating in opposite directions around the coil of optical fiber. The detected signal corresponding to the phase difference between the counter-propagating beams is typically subjected to some form of phase modulation, and the photodetector converts the modulation to an electric signal which is indicative of the degree of rotation of the fiber coil and is electronically processed to provide a direct indication thereof.

It follows that any other effect which causes a non-reciprocal difference in phase between the two paths during the transit time of the light around the coil will be registered as a false rotation. One such effect, the Shupe effect, is due to the passing of a thermal gradient through the coil; the change in temperature produces a change in the refractive index of the material from which the fiber is made. Typically for silica the change of index with temperature is approximately 10 parts per million per °C. The effect is best illustrated by considering a gyro with a coil having a single turn.

Figure 1:
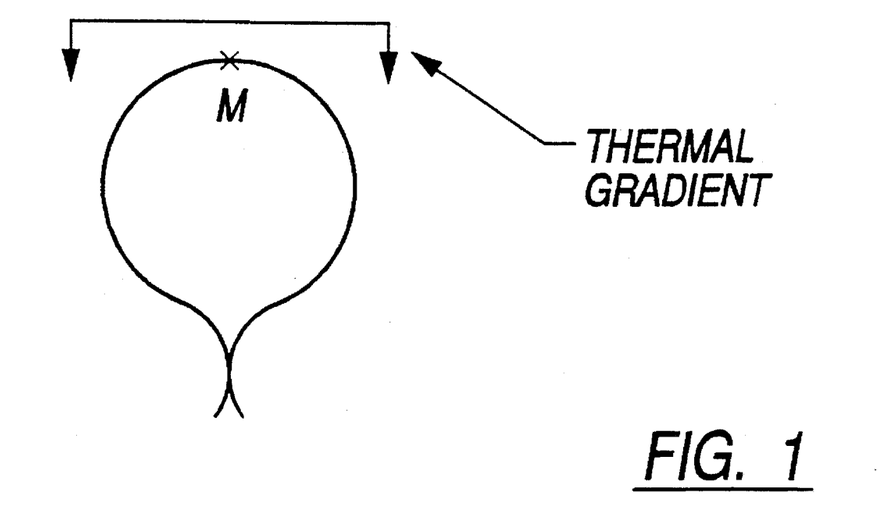
FIG. 1 is a diagrammatic illustration of a fiber-optic sensing coil being traversed by a thermal gradient symmetrically with respect to the mid-point of the fiber forming the coil.
Figure 2:
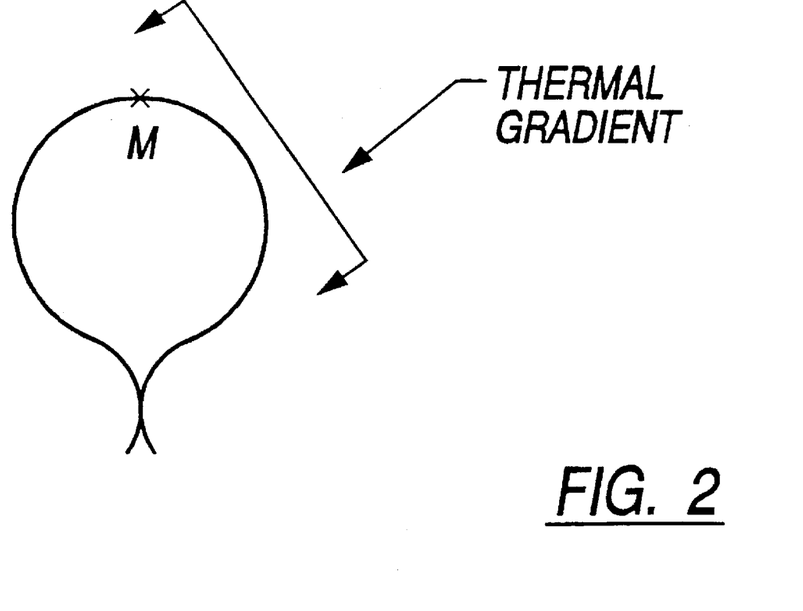
FIG. 2 is a diagrammatic illustration of a fiber-optic sensing coil being traversed by a thermal gradient asymmetrically with respect to the mid-point of the fiber forming the coil.

If, as in FIG. 1, a thermal gradient traverses the coil so that it is symmetrical with respect to the mid-point M of the fiber that forms the coil, sections on either side of M will experience identical changes in index at any time so that there will be no net phase difference between clockwise and counterclockwise light paths. However, if, as in FIG. 2, the thermal gradient traverses the coil asymmetrically with respect to the mid-point, the sections on either side of M will experience different changes in index at different times producing a change in phase between the two light paths and thus giving a spurious rotation signal. The same situation holds for a multi-turn coil. Here there is a phase shift between the clockwise and counterclockwise paths if there is any net asymmetry of thermal gradient integrated over all the turns of the coil.

The Shupe effect generally increases as the length of fiber used to form the coil decreases, because fewer turns are formed as the fiber length is reduced.

It is current practice to reduce the Shupe effect by winding the coil in a controlled and ordered manner such that the fiber elements equidistant from the midpoint are adjacent so that the temperature gradient at all points affects the fiber on both sides of the midpoint equally and at the same time. Such coils, known as Shupe coils, involve a very complicated and controlled winding procedure and are consequently expensive to produce.

Another problem with fiber-optic gyros is the need to maintain the axis of the sensing coil perpendicular to the plane in which the inertial rotation is being measured. If this perpendicular relationship is not maintained, then the rotation sensed by the gyro is not the rotation in the desired plane.

SUMMARY OF THE INVENTION

It is a primary object of this invention to provide an improved fiber-optic gyro which provides highly accurate rotation measurement with a sensing coil that can be wound quickly and inexpensively. In this connection, a related object of the invention is to provide a gyro sensing coil that does not require a complicated winding procedure, and that can be wound on a simple core.

A related object of the present invention is to provide an improved fiber-optic gyro of the above type which reduces or eliminates thermally induced non-reciprocal phase shifts.

Yet another object of this invention is to provide a fiber-optic gyro having an improved sensing coil that permits the length of fiber in the coil to be reduced.

A further object of the present invention is to provide a fiber-optic gyro with a sensing coil that is extremely compact in the direction of its axis. In this connection, a related object is to provide such a gyro that facilitates attainment of the desired perpendicular relationship between the axis of the sensing coil and the plane in which it is desired to measure rotation.

Still another object of this invention is to provide a fiber-optic gyro having a sensing coil that is relatively unaffected by stresses. In this connection, one specific object is to provide a gyro sensing coil that does not require a central supporting core or bobbin in the gyro.

In accordance with the present invention, the foregoing objectives are realized by providing a fiber-optic gyro including a coil of optical fiber having multiple turns which are collapsed in the direction of the axis of the coil, and which vary in diameter on both sides of the mid-point of the fiber that forms the coil. The range of the variations in the sizes of the multiple turns is preferably about the same on both sides of the mid-point of the fiber. The coil is formed by winding the optical fiber on a bobbin having a shape that varies in size along its length, such as a cone, with fiber on both sides of the fiber mid-point being wound on portions of the bobbin that vary over similar size ranges. The coil is then removed from the bobbin and collapsed in the direction of the coil axis. This provides a substantially flat coil in which the turns formed from fiber on opposite sides of the mid-point are distributed throughout the annular thickness of the coil.

DETAILED DESCRIPTION OF THE PREFERRED EMBODIMENTS

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

Figure 3:
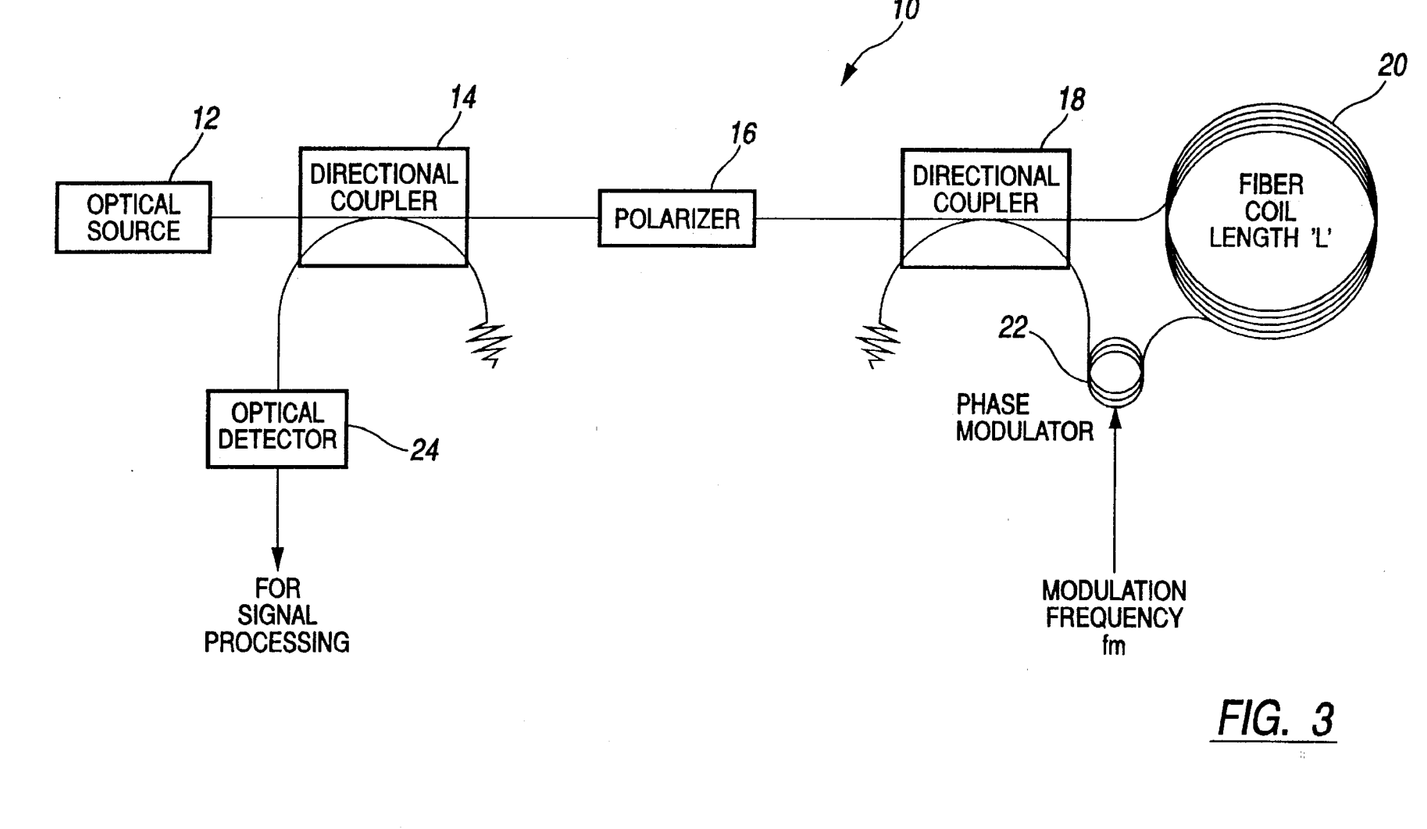
FIG. 3 is a block diagram illustrating a conventional open-loop optical fiber gyro arrangement.

Referring now to FIG. 3, there is shown a block diagram illustrating a conventional optical fiber gyro system 10 operating in an open-loop mode. The gyro system 10 includes an optical source 12 which is preferably a diode laser oscillating predominantly in a single transverse mode and having a broad and Gaussian-shaped optical spectrum so that back-scatter noise and Kerr-effect problems are reduced. A light beam from the optical source 12 is directed to an optical directional coupler 14 which functions as a beam splitter.

A portion of the light beam entering the directional coupler 14 is transmitted through a polarizer 16 before being directed into a second optical directional coupler 18. The directional coupler 18 also functions as a beam splitter to produce two separate light beams, one of which is directed into one end of a multi-turn fiber coil 20. The other light beam from the directional coupler 18 is directed through a phase modulator 22 into the other end of the fiber coil 20. Light emerging from the two fiber ends is combined by the directional coupler 18 and detected by an optical photodetector 24.

The light beams directed into the two ends of the fiber coil 20 constitute counter-propagating beams which have identical path lengths in the absence of coil rotation. When the fiber coil 20 undergoes rotation about its axis of symmetry, the relative path lengths of the two light beams also change correspondingly. For instance, if the coil rotates in a clockwise direction, the path length of the clockwise beam is increased while the path length of the counterclockwise beam is decreased. As a result, any rotation of the optical fiber coil causes the two counter-propagating beams to undergo a non-reciprocal phase shift. This phenomenon is known as the Sagnac effect. The non-reciprocal phase shift due to rotation, known as the Sagnac phase shift, when measured accurately, provides a true indication of the degree of rate of rotation experienced by the fiber coil.

In the gyro arrangement of FIG. 1, the output of the photodetector 24 is subjected to conventional signal processing to provide an outward indication of the rotation rate being sensed.

It is important that the two counter-propagating light beams have the same polarization, so that the Sagnac phase shift accurately corresponds to the sensed rotation rate. If the states of polarization of the two counter-propagating light beams are not identical, their propagation constants are not necessarily the same. Consequently, the phases of the two interfering beams may differ after the beams pass through the fiber coil, thereby leading to a sensing error which can substantially impair measurement accuracy, particularly when extremely low rotation rates are sensed. For instance, the phase difference resulting from bending (stress-induced) birefringence in a typical fiber coil, which can be of the order of several hundred radians, can totally obscure the Sagnac phase shift realized when a gyro rotates at earth rate, which is of the order of $10^{-4}$ rad.

This sensing error is reduced by using the portions of the light beams that have passed through the fiber coil with identical polarization states. In order to assure total reciprocity of the sensing system, it is also important that the counter-propagating light beams comprise only a single state of polarization. Even when symmetric single-mode fiber is used, two degenerate polarization modes are generated. A small amount of random asymmetry exists in real fiber and results in a small amount of random birefringence which, coupled with additional birefringence created by bending and twisting of the fiber, causes the polarization of the light guided along the fiber to vary along the length of the fiber.

In the measurement of rotation based on the Sagnac effect and using a gyro system of the type illustrated in FIG. 3, the Sagnac phase shift $\phi$ (radians) in the detected signal at a given frequency $f_m$ is given by the following relationship:

$$\phi = \frac{4\omega_0 \dot{\phi}}{C^2} * A \tag{1}$$

where $\omega_o$ is the radian frequency of the optical source in radians/sec, $\dot{\phi}$ is the rate of rotation of the gyro in radians/sec, C is the velocity of light in free space in meters/sec, and A is the total area enclosed by the fiber coil as represented by the product of the area enclosed by a single turn of fiber and the number of turns in the coil.

In measuring the Sagnac phase shift $\phi$, the measured optical power is proportional to the square of the absolute value of the detected electric field. Further, the optical power and phases of the interfering light beams are equal in a reciprocal system. Ignoring the non-reciprocal power difference, which is negligible for the typically used coil lengths, the detected power $P_D$ is largely dependent upon the non-reciprocal phase difference $\phi_{NR}$ and is related to the input power $P_0$ as follows:

$$P_D = \frac{P_0(1 + \cos \phi_{NR})}{2} \tag{2}$$

The cosine factor in Equation (2) approaches its maximum value when the total non-reciprocal phase difference is much less than 1 rad. Thus, the detected power becomes insensitive to the typically small phase shifts induced due to rotation. It therefore becomes necessary to add a biasing phase difference to shift the sensed signal so as to avoid both the maxima and minima of the sinusoid.

The phase modulator 22 in the gyro system of FIG. 3 performs this function by creating the desired amount of phase difference modulation so that the amplitude of the optical power, which varies at the frequency of phase modulation $f_m$, is made proportional to small rotation rates. Since the phase modulator 22 is positioned at one end of the fiber coil 20, the two counter-propagating light beams both receive the same phase modulation but at different times, thereby realizing a non-reciprocal phase difference modulation between the interfering beams. Since the sensed signal becomes biased on a high-frequency carrier, (i.e., the phase modulation signal,) electronic noise is substantially eliminated while measurement sensitivity is increased.

In an all-fiber implementation of the gyro arrangement shown in FIG. 3, a unitary length of optical fiber is used for the fiber coil 20, with a segment of fiber extending from one end of the coil being used to establish a light path between the optical source 12, the directional coupler 14, the polarizer 16, and the coupler 18. A segment of fiber extending from the other end of the coil 20 establishes a light path between the corresponding coil end, the phase modulator 22 and the directional coupler 18.

The phase modulator 22 is typically of the mechanical modulation type wherein a short section of optical fiber is wrapped over a piezoelectric (PZT) cylinder. When a time-varying electric field is applied to the PZT cylinder, mechanical stress is induced therein and varies the radius of the cylinder. As a result, the diameter of the fiber around the PZT cylinder is also varied correspondingly. Hence, the fiber diameter and refractive indices and, therefore, the phase of the wave being guided through the fiber, are modulated in proportion to the applied signal.

As is evident from Equation (1), in fiber-optic gyro systems of the type illustrated in FIG. 3, the Sagnac phase shift and, hence, the sensitivity of measurement, is directly proportional to the total area enclosed by the fiber coil, i.e., the product of the area enclosed by one turn of the fiber coil and the total number of turns in the coil. For a coil having a fixed coil diameter, the sensitivity, which is proportional to the overall distance travelled by the counter-propagating beams within the coils, can be enhanced by increasing the number of turns on the coil.

For optimizing the performance of the gyro system of FIG. 3, rotation sensitivity must be maximized and noise sensitivity must be minimized. To accomplish this, it is necessary to match the transit time t required for the counter-propagating light beams to traverse the length of the fiber coil with the phase modulation frequency $f_m$ according to the following relationship:

$$\omega_m * t = \pi \qquad (3)$$

where $\omega_m$ is the radian frequency of the modulation source and is equal to $2\pi f_m$. In terms of the group velocity $V_g$ of the optical wave guided by the fiber, the transit time t is defined as below:

$$t = \frac{L}{V_g} \qquad (4)$$

where L is the coil length in meters and $V_g$ is the group velocity in meters/second.

Substituting from Equation (4) into Equation (3), the modulation frequency $f_m$, is defined as below:

$$f_m = \frac{V_g}{2L} \qquad (5)$$

Since the group velocity $V_g$ is approximately equal to $$\frac{C}{n_c}$$

where $n_c$ is the average refractive index of the fiber core and cladding and C is the velocity of light, the quantity $V_g$ represents a constant. Accordingly, the modulation frequency $f_m$ is inversely proportional to the coil length.

The above discussion assumes a constant temperature throughout the fiber coil 20. As mentioned previously, one of the sources of drift in a fiber-optic gyro when used in a changing environment is time-dependent thermal gradients. In the hypothetical case of a single-layer coil wound in a uniform spiral of constant radius, a temperature change at only one end of the coil produces a change in the refractive index of the coil fiber at that end of the coil. Consequently, the light beam which enters the coil at that end will undergo a phase shift before the corresponding portion of the counter-propagating light beam reaches that end of the coil. Because this phase shift is not caused by rotation of the coil, it represents an error when detected in the photodetector.

In accordance with the present invention, the thermally induced non-reciprocal phase shifts are reduced or eliminated by use of a fiber coil in which the coil turns vary in size on both sides of the mid-point of the fiber that forms the coil, and are collapsed in the direction of the axis of the coil. Such a coil significantly reduces thermally induced non-reciprocity in the coil. The variations in the sizes of the multiple turns of the coil need not follow any regular pattern, but rather are preferably randomly distributed so that each incremental advance of a thermal gradient across the coil is likely to affect portions of the coil on both sides of the mid-point of the total length of fiber forming the coil. Thus, a thermal gradient from any direction will cause random phase shifts in all the turns so that there is no net phase shift when integrated over the whole coil. Such a system is clearly impossible for a single turn coil, but the extent of the random excursion in phase decreases linearly with the number of turns. These random excursions can be considered as noise which is further reduced, via the quantum model of noise, by the square root of the number of turns, N. Thus the magnitude of the phase shift "noise" generated by a thermal gradient traversing the coil is proportional to $N^{-1}$, $N^{-1/2}$ or $N^{-3/2}$.

To produce coil turns that vary in size, the coil may be wound on a conical core. To achieve random distribution of the different sizes of coil turns formed from fiber on both sides of the mid-point of the total length of fiber used to form the coil, the fiber may be wound on the conical core while traversing the winding point back and forth along the core surface in the longitudinal direction. Preferably, the beginning and ending points of the traversing movements are also randomly varied.

Figure 4A:
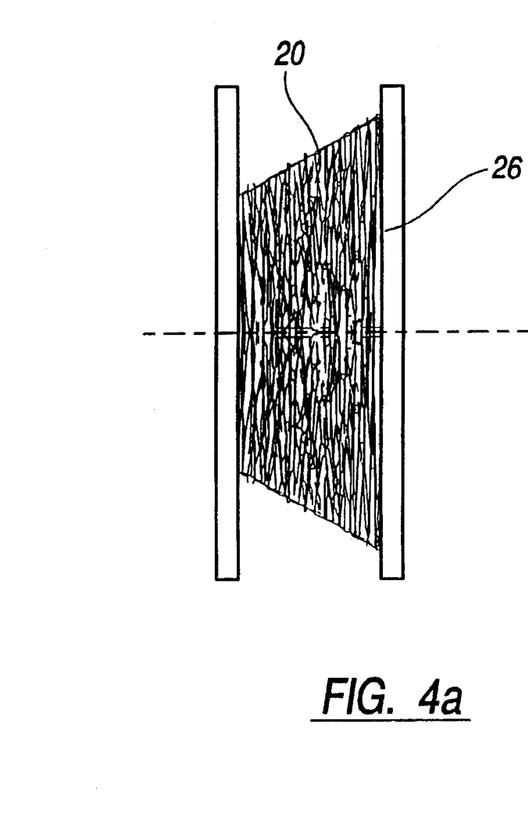
FIG. 4a is an illustration of an improved winding arrangement of a fiber coil adapted for use in the gyro arrangement of FIG. 3, in accordance with a preferred embodiment of this invention.
Figure 4B:
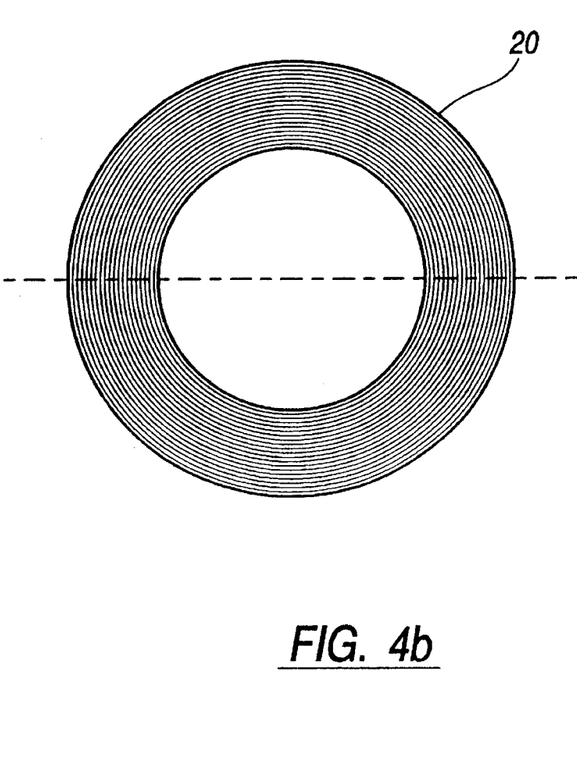
FIGS. 4b and 4c are plan and side elevation views, respectively, of the wound coil of FIG. 4a after being collapsed.
Figure 4C:
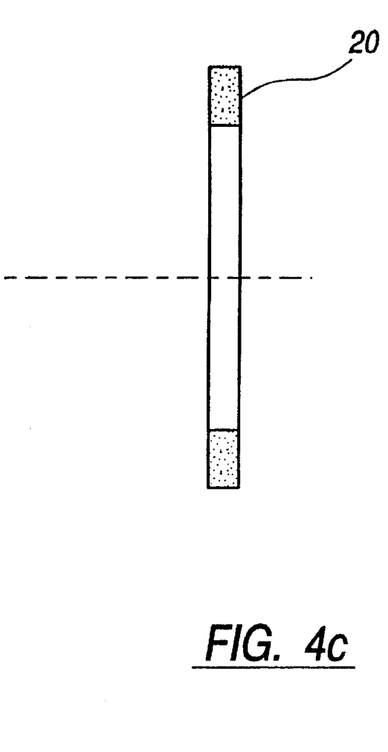

By winding multiple layers of a continuous length of optical fiber around a conical core 26, as illustrated in FIG. 4a, and then collapsing the coil 20 in the axial direction when it is removed from the core, as illustrated in FIGS. 4b and 4c, the fiber on both sides of the mid-point is distributed randomly throughout the coil in both the axial and radial directions. Consequently, each increment of movement of a thermal gradient that traverses the coil affects fiber on both sides of the mid-point, thereby reducing or even eliminating the undesired non-reciprocal phase shifts. The preferred core angle, i.e., the angle between the axis of the conical core and the conical surface, is between about 20° and about 40°.

When the coil is wound on a conical bobbin, the coil can be removed from the bobbin by simply pushing the coil toward the small end of the bobbin. Alternatively, a collapsible bobbin can be employed. For example, an inflatable bobbin can be used, and simply deflated after the winding of each coil. Mechanically collapsible bobbins may also be used. Collapsible bobbins also permit the use of variable-diameter bobbin shapes other than conical, such as corrugated or sawtooth shapes.

By removing the fiber from the bobbin and then collapsing the coil along its axis, stresses exerted on the coiled fiber during the winding process are removed. Moreover, there is no bobbin to transmit thermal expansion or other stresses to the coil after the coil has been mounted in the gyro and connected to the other components of the gyro.

Although it is preferred to form the sensing coil of this invention from optical fiber which maintains the polarization of the counter-propagating light waves by the non-circular geometry of the fiber core (e.g., a;n elliptical core), this invention is also useful for coils formed from optical fibers that have circular cores and maintain polarization by stress-induced birefringence. This invention eliminates or reduces undesired stresses on the fiber both from the winding process and from the mounting structure, and thus improves the polarization-holding performance of coils formed from fibers that rely on stress-induced birefringence.

The collapsing of the coil in the axial direction not only removes stresses from the coil, but also produces a coil that is substantially flat. That is, the axial thickness of the coil is very small, typically only 2 or 3 millimeters. This flat coil enables the entire gyro to be made with a very thin profile, and also facilitates the desired orthogonal alignment of the coil axis with the plane in which it is desired to measure rotation.

The optical fiber used to form the sensing coil is preferably coated with a protective polymeric coating. Certain optical fibers are coated with metal, which can crack when wound into a coil with a relatively small radius. The polymeric coatings, however, do not exhibit the cracking problem. The fiber that forms the coil may also be coated with an oil or other lubricant to facilitate sliding movement of adjacent windings over each other as the coil relaxes after being formed.

Figure 5:
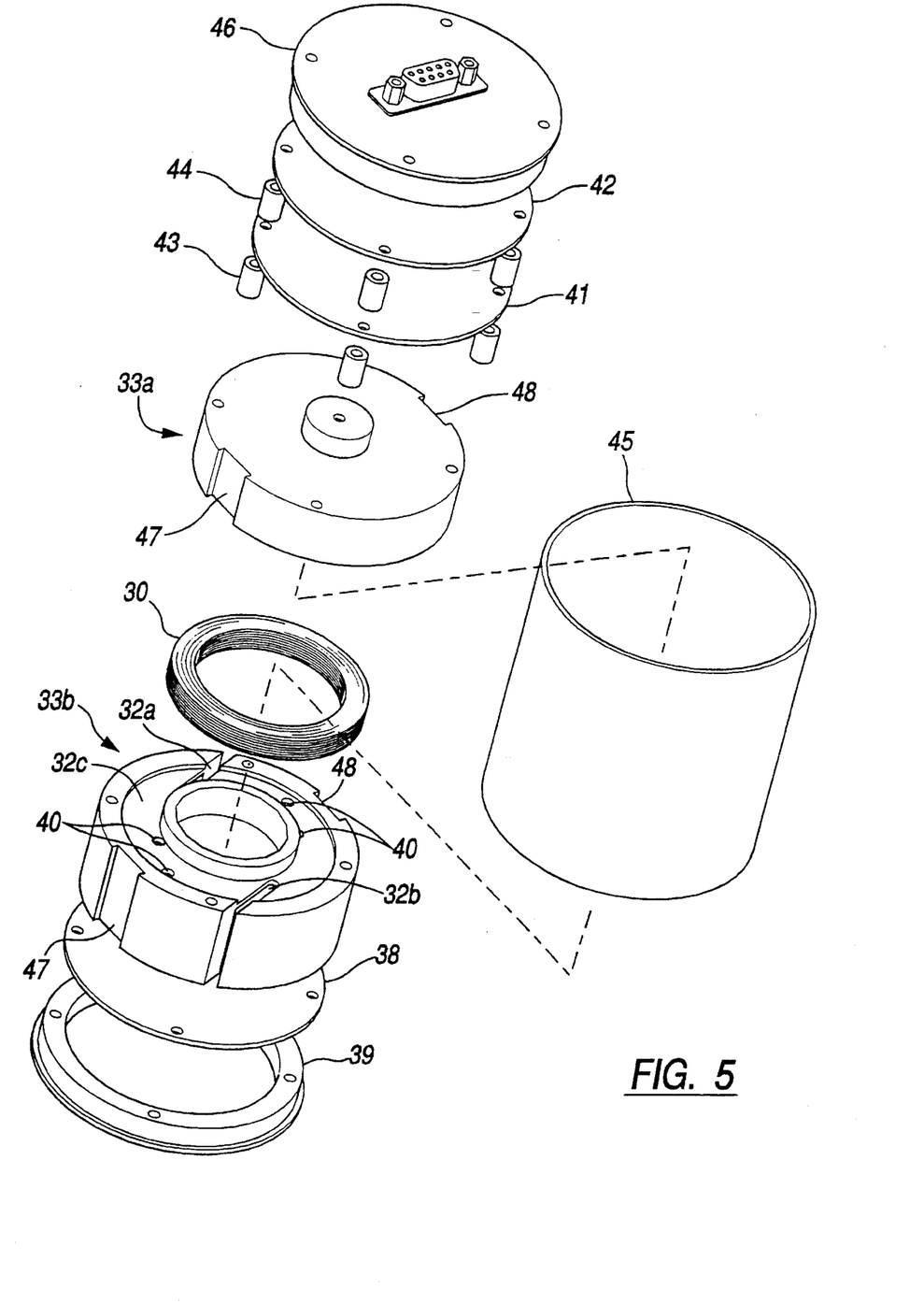
FIG. 5 is an exploded perspective view of a preferred mounting arrangement for the fiber-optic sensing coil of the present invention.
Figure 6:
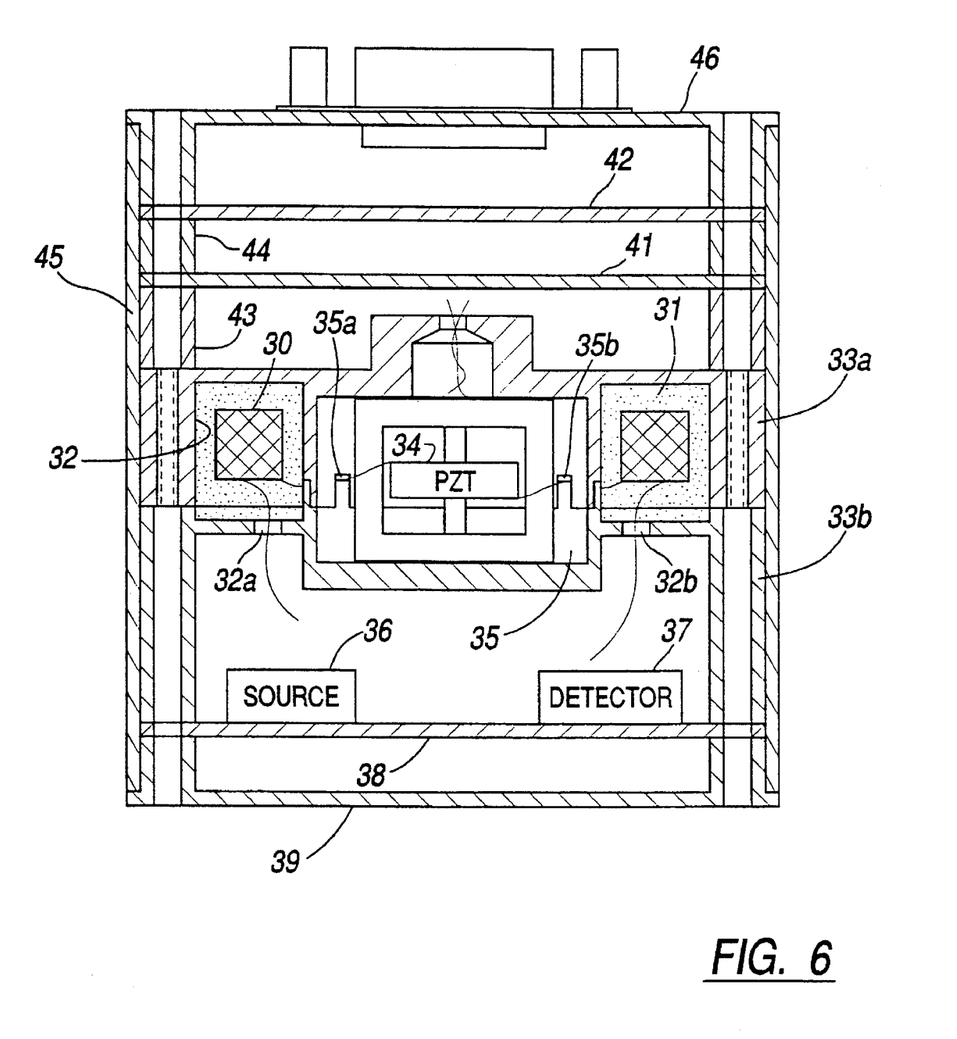
FIG. 6 is an enlarged vertical sectional view of the sensing coil mounting assembly shown in FIG. 5.
Figure 8:
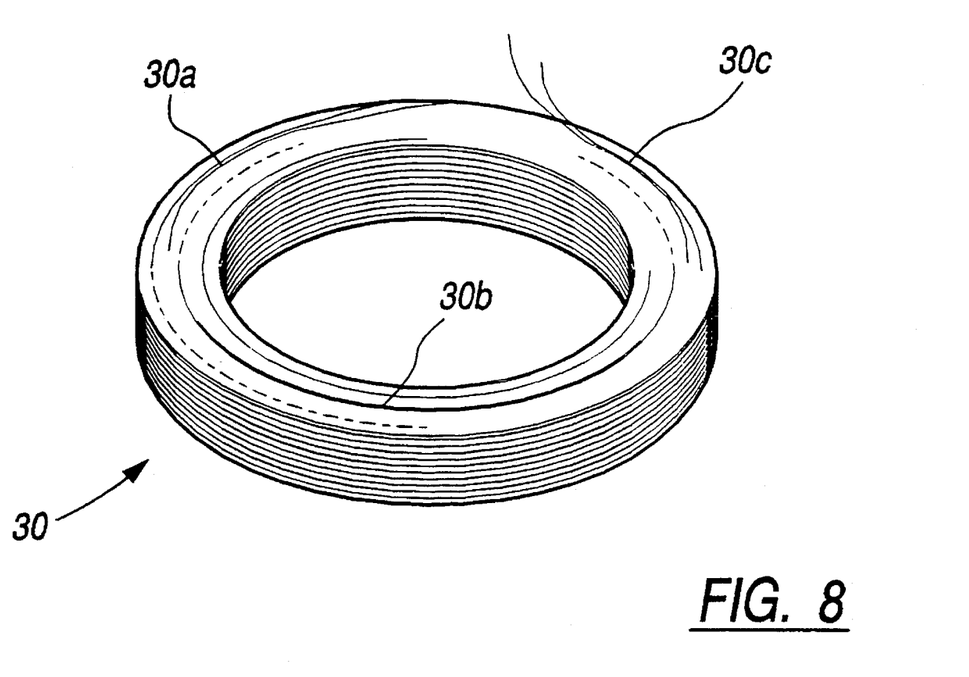
FIG. 8 is an enlarged perspective view of the sensing coil in the assembly of FIGS. 5–7.

FIGS. 5 and 6 illustrate a preferred mounting arrangement for the sensing coil of this invention. The multi-turn coil 30 is disposed within a body of gel 31 contained in an annular cavity 32 formed by an aluminum housing 33. The coil 30 is preferably pre-formed and connected to a directional coupler 30a (see FIG. 8) connected in series with a polarizer 30b and a second directional coupler 30c. The coil, the directional couplers, and the polarizer are then all submerged within the gel 31 with a length of the fiber at one end of the coil extending through a pair of holes 35a and 35b in the inner wall of the cavity 32 to form part of a piezoelectric phase modulator or PZT 34 mounted within a central cavity 35 formed by the housing 33. The two fibers at the end of the directional coupler distal from the coil extend downwardly through a pair of slots 32a and 32b in the bottom wall of the cavity 32 for connection to a laser 36 and a photodetector 37 mounted on a printed circuit board (PCB) 38. The PCB 38 is attached to the lower portion of the housing 33 by a bottom plate 39 and a plurality of screws. Two additional PCBs 41 and 42 mounted above the housing 33 contain the power supply and signal processing circuitry for the gyroscope. The PCBs 41 and 42 are spaced from each other and from the housing 33 by two sets of spacer posts 43 and 44. All these elements are nested inside a protective cylinder 45 along with the housing 33 and the PCB 38, and then a top plate 46 closes the end of the cylinder 45. A plurality of screws are passed through the top plate 46, the two PCBs 41 and 42 and the spacer posts 43 and 44, and are threaded into the housing 33. Channels 47 and 48 in the outer wall of the housing accommodate a wiring harness (not shown) for interconnecting the various PCBs.

To protect the optical fiber from forces exerted by acceleration and vibrations on the leads extending from the housing 33 to the laser 36 and the photodetector 37, the space between the PCB 38 and the bottom of the cavity 32 is preferably filled with the same gel used in the cavity 32. This additional gel holds the leads in stable positions between the cavity 32 and the PCB 38.

The optical fiber for forming the coil 30 is single-moded and preferably polarization-holding, such as a fiber having an elliptical polarization-maintaining core or the D-shaped fiber described in Dyott U.S. Pat. No. 4,669,814. Alternatively, stress-induced birefringent or high-numerical-aperture single-mode fiber may be used. The fiber preferably has a polymeric buffer coating on it, although other types of protective coatings may be employed if desired, such as indium coated fiber.

Figure 7A:
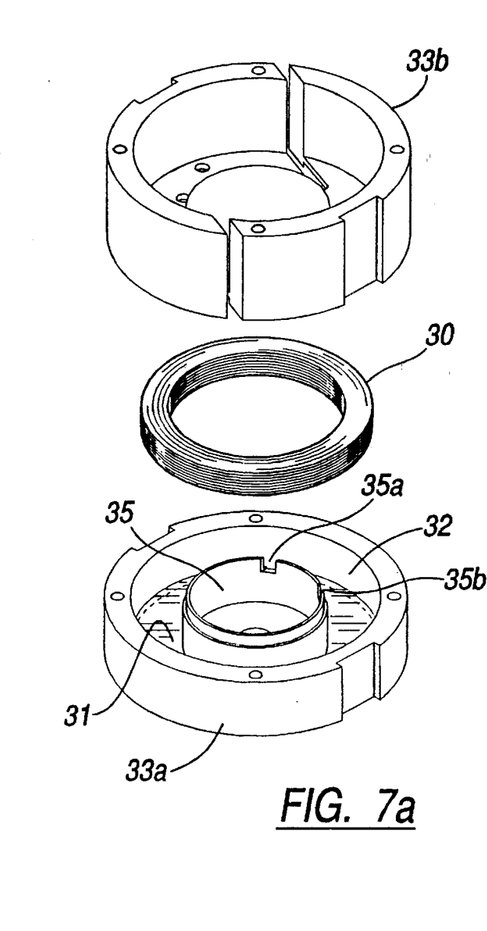
FIGS. 7a–7d are perspective views of certain of the elements shown in FIGS. 5 and 6, illustrating sequential stages in the assembly thereof.
Figure 7B:
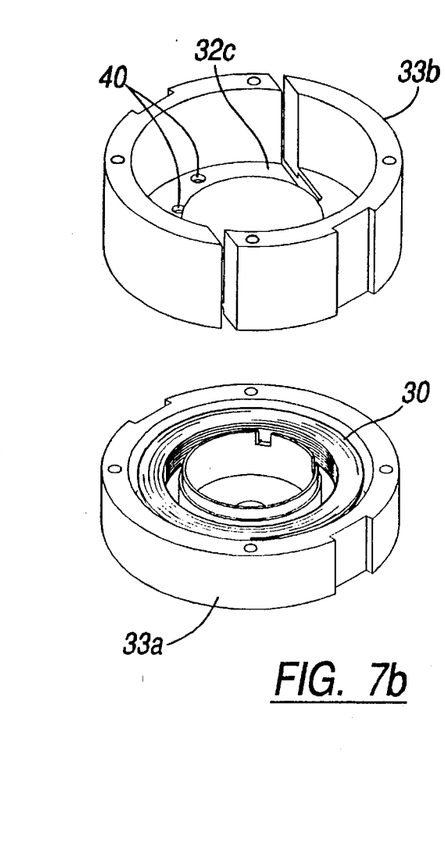
Figure 7C:
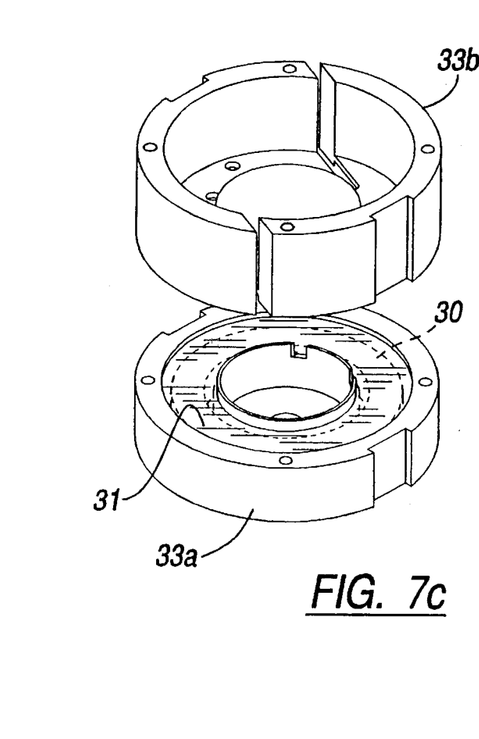
Figure 7D:
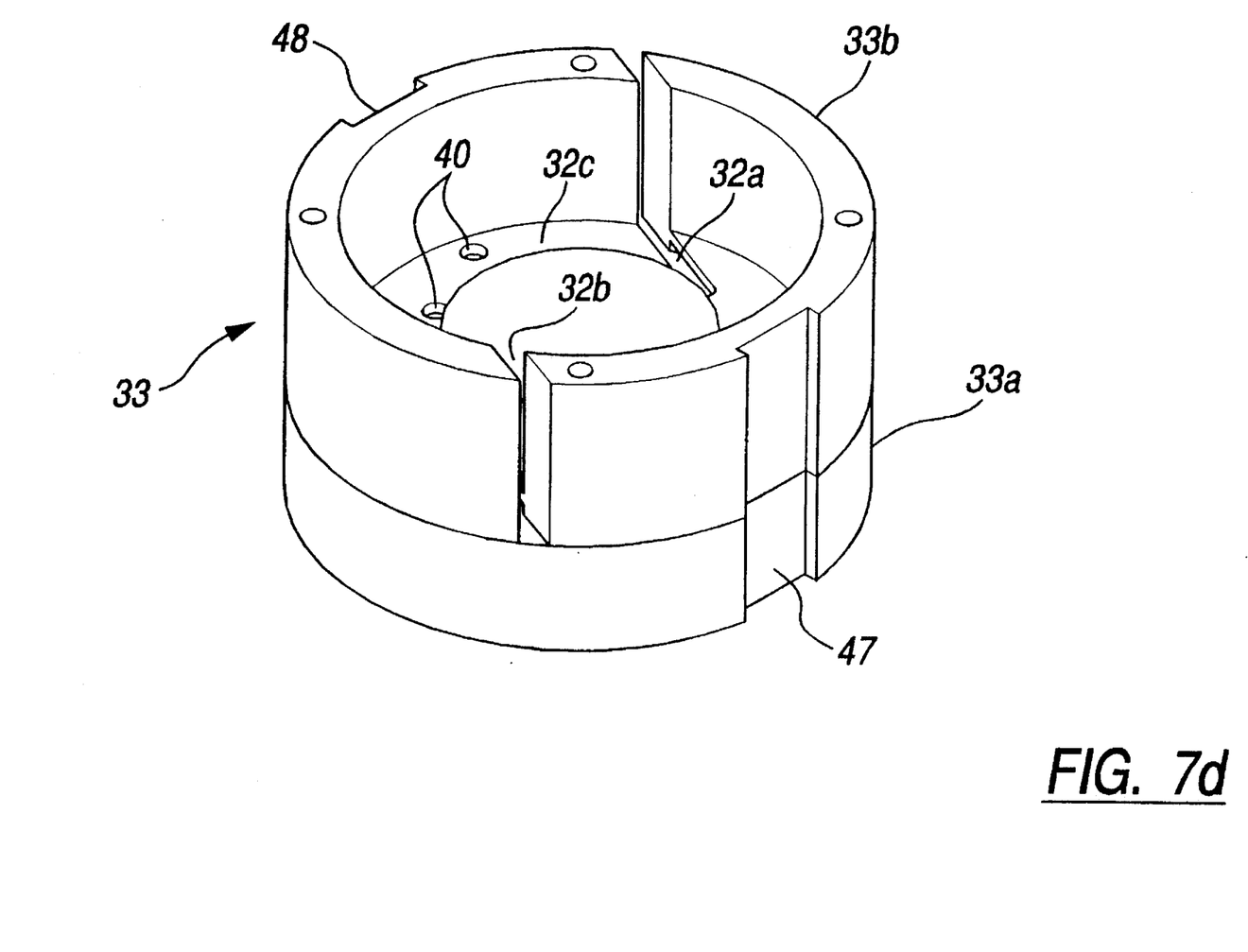

In the illustrated embodiment, the body of the optical fiber coil 30 contacts only the gel 31, and thus is supported within the housing 33 solely by the gel 31. As shown in FIG. 7a, the gel is initially formed as a layer on the bottom wall of the cavity 32, while that bottom wall is held in a perfectly horizontal position. The upper surface of the gel layer is then perfectly level and horizontal, as is the coil 30 when it is placed on top of the gel layer. Alternatively, the coil can be placed on a mounting surface. As such, the mounting surface could replace the initial layer of gel or be placed on top of the initial layer of gel. In the illustrated embodiment, the housing 33 is made in two parts 33a and 33b to facilitate placement of the coil within the housing and the gel contained therein.

After the coil 30 has been placed on the bedding layer of gel in the housing part 33a, the second housing part 33b is attached to the first part, and then the rest of the cavity 32 is filled with additional gel though one of the expansion holes 40 described below. The additional gel envelopes the coil 30 and forms a unitary gelatinous mass with the bedding layer of gel. The entire mass of gel preferably bonds to the inside walls of the cavity 32 as the gel solidifies. Thus the fiber coil 30 and its attached components (the directional couplers and the polarizer) are ultimately submerged completely within the gel 31, with the two free ends of the fibers forming the distal coupler exiting the gel through the slots 32a and 32b in the bottom wall of the cavity 32.

The stiffness or Young's modulus of the gel is sufficiently great to support the coil 30 in a fixed position within the housing 32. That is, the coil will not migrate in any direction, either rotationally, axially, or radially, within the mass of the gel. This fixed position of the coil must be maintained over the desired range of operating temperatures, which is typically from about −55° C. to about +85° C. The temperature at which a gel solidifies or changes to a brittle vitreous state is referred to as the glass transition temperature. For the purposes of this invention, the glass transition temperature should be below the operating temperature range of the gyroscope.

To accommodate expansion and contraction of the gel with changing temperature, one or more walls of the cavity 32 are preferably provided with recesses into which the gel may expand without subjecting the coil 30 to significant pressure changes. In the illustrated embodiment, the recesses are formed by a plurality of holes 40 in the cavity wall 32c. The effect of the holes 40 is to accommodate the change in volume of the gel 31 over the operating temperature range of the gyroscope, so that the gel expands and contracts through the holes 40 rather than significantly changing the pressure on the coil 30. As an alternative to the holes 40, the cavity walls can be formed in part of a flexible material, or the upper surface can be grooved. Another alternative is to embed one or more resilient compressible elements within the gel 31. For example, air bubbles may also be entrained in the gel.

If desired, the specific gravity of the gel 31 can be adjusted to approximate that of the coil 30. The coil typically has an effective specific gravity greater or less than 1.0, whereas the gel may have a specific gravity of about 1.0. The difference in the specific gravities can cause the coil-gel combination to act as a spring-mass system, which can result in spurious output signals from the gyroscope if the spring-mass system has resonant frequencies within the frequency range of a vibratory input. To avoid this problem, the gel may be loaded with solid or hollow silica microspheres or particles to reduce the difference between the specific gravities of the gel and the coil and thereby adjust the resonant frequencies of the coil-gel combination. The loading of the gel also increases the viscosity and stiffness of the gel.

The illustrative mounting arrangement yields excellent results in preserving the fiber h. As discussed, the present invention includes provisions for allowing the gel to expand so that the coil does not experience pressure, such as relief areas in the top surface plate, diaphragms, and air sacks.

If desired, the gel may be loaded with solid or hollow microspheres. Loading the gel with particles (preferably of silica but other particles are available) has several advantageous effects in addition to modifying the specific gravity. The low thermal coefficient of expansion of the silica (or similar particle material) reduces the overall bulk thermal coefficient of expansion of the loaded gel without placing any physical strain on the coil. Loading the gel with up to 40% by volume of silica particles has been tried, and greater loadings can be practical. For example, a loaded gel having 50% by volume of silica particles reduces the thermal coefficient of expansion of the gel from about 300 ppm/deg C. to about 150 ppm/deg C. with a corresponding reduction in the effects associated with thermal changes.

The particles can be either hollow or solid, irregular or spherical, and the average size of the particles can vary. Typically, solid particles used as fillers range from 20–300 microns in diameter, but the particles can vary to average sizes outside this range. According to a book by Lee et al. entitled *The Handbook of Epoxy Resins*, McGraw-Hill, herein incorporated by reference, in the section entitled "Settling Properties of Fillers," the typical solid particles used as fillers for epoxy resins are those that pass through a 325 mesh sieve, which has an opening of 0.0017 inches (44 microns), and also common are particles that pass through a 200 mesh sieve, which has an opening of 0.0029 inches (74 microns). Table 14-2 of the book shows that solid particles having average sizes ranging from 0.015 microns to 2500 microns are used as fillers for epoxy resins. For example, quartz is used in average sizes up to 300 microns, but solid particles having sizes greater than 300 microns can settle very rapidly in the gel depending on the specific gravity of the particles. As such, maximum solid particle size of 300 microns or less is preferable. The settling properties of hollow particles are different than those of solid particles, and thereby hollow particles can have larger average sizes without settling.

The particles are preferably made of silica and remain suspended in the gel, but one particle cannot exert much force on others because the force would also react on the gel matrix which is very weak. Moreover, if the particles can exert too much force on each other, the force could propagate through the gel matrix to adversely affect the coil. This could become a problem when the loading is sufficiently high to form clumps of particles.

Furthermore, recognizing that the differential thermal coefficient of expansion of the gel and the coil housing can cause unwanted material flows, it can be desirable to make them as equal as possible. This could be achieved by making the housing from a plastic material or other similar material. As this is unlikely to have the exact thermal coefficient of expansion of the gel, the particle loading could be used to adjust the gel thermal coefficient for best performance.

Another advantage of loading the gel with particles involves increasing the gel viscosity. This is a known effect in gels, but the benefit is that the gel acts as an improved vibration damper. For instance, the gel has been qualitatively observed to quiver or vibrate when stimulated by a mechanical input, but the amplitude of this vibration decreases markedly when the gel is loaded with particles. Consequently, the vibration damping effect of the loaded gel reduces the potential amplification of vibrating inputs.

The viscous or Coulomb damping can also serve to reduce the input of high frequency vibrations from the environment to the Sagnac ring. As such, the gyro designer will have another degree of control over the performance of the gyro. In some situations, the presence of high frequency vibration inputs can overload the signal processing electronics. This arises as the angular rate increases proportionally to frequency for a constant angular displacement.

An additional advantage of loading the gel with the particles is that the bulk thermal conductivity of the gel can be modified. The change in thermal properties can be controlled by adjusting the volumetric ratio loadings as well as the ratio of solid to microballoon particles. Lowering the thermal conductivity can be significant in controlling time-dependent thermal gradient effects.

Alternatively, in another embodiment of the present invention, the gel viscosity can also be increased by dispersion of particles with diameters of a micron or less. Only about a 5% loading of micron sized particles into the gel would be required to achieve a very viscous gel. Such a loaded gel permits the control of the vibrational effects but has little impact on the thermal properties of the gel. Loading the gel, however, with particles having diameters of a micron or less at the volumetric proportions described above for larger particles would make the gel too viscous to pour. Depending on the specific engineering problem being addressed, the alternatives for modifying the gel properties can be combined, thereby loading the gel with particles of a micron or less at lower volumetric proportions to increase gel viscosity together with the larger sized particles (solid, microballoons or both) at higher volumetric proportions to vary the thermal and specific gravity properties of the gel.

Additionally, the particle loading will increase the bulk modulus, increasing both the transverse and rotary natural frequencies of the ring and gel as a spring mass system. Thus additional design flexibility will be achieved by being able to modify the mechanical properties of the overall system.

Although the invention has been illustrated in the drawings as utilizing a circular coil, it should be understood that the coil may have other geometric shapes, such as elliptical or rectangular.

Comparative tests were conducted on a pair of fiber-optic gyros. One gyro was equipped with a sensing coil formed of 75 meters of optical fiber having an elliptical core and wound on a cylindrical aluminum bobbin having a diameter of 3 inches. The other gyro was equipped with a sensing coil formed from 75 meters of the same fiber wound initially on a conical bobbin tapering from a diameter of 3 inches at one end to 2 inches at the other end, and then removed from the bobbin and collapsed along its axis. Each sensing coil was placed on a hot plate, with one end of the coil resting on the plate, and the gyro output was measured every 10 seconds over a period of about 2 hours. The temperature of the hot plate was also measured over the same time period, and plotted along with the first derivative of the temperature curve.

Figure 9:
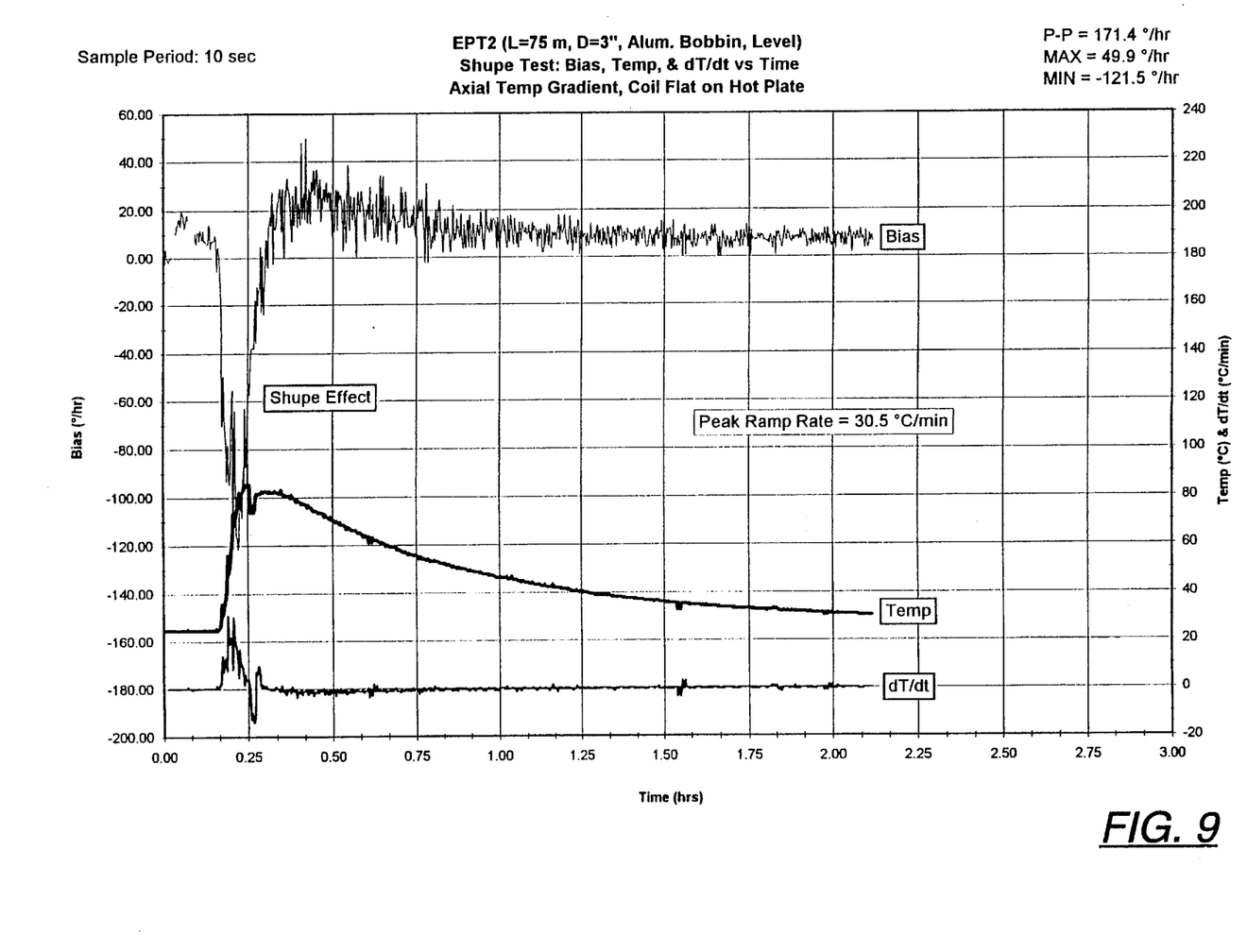
FIG. 9 is a graph of the results of a test of a fiber-optic gyro equipped with a sensing coil wound on a cylindrical core.
Figure 10:
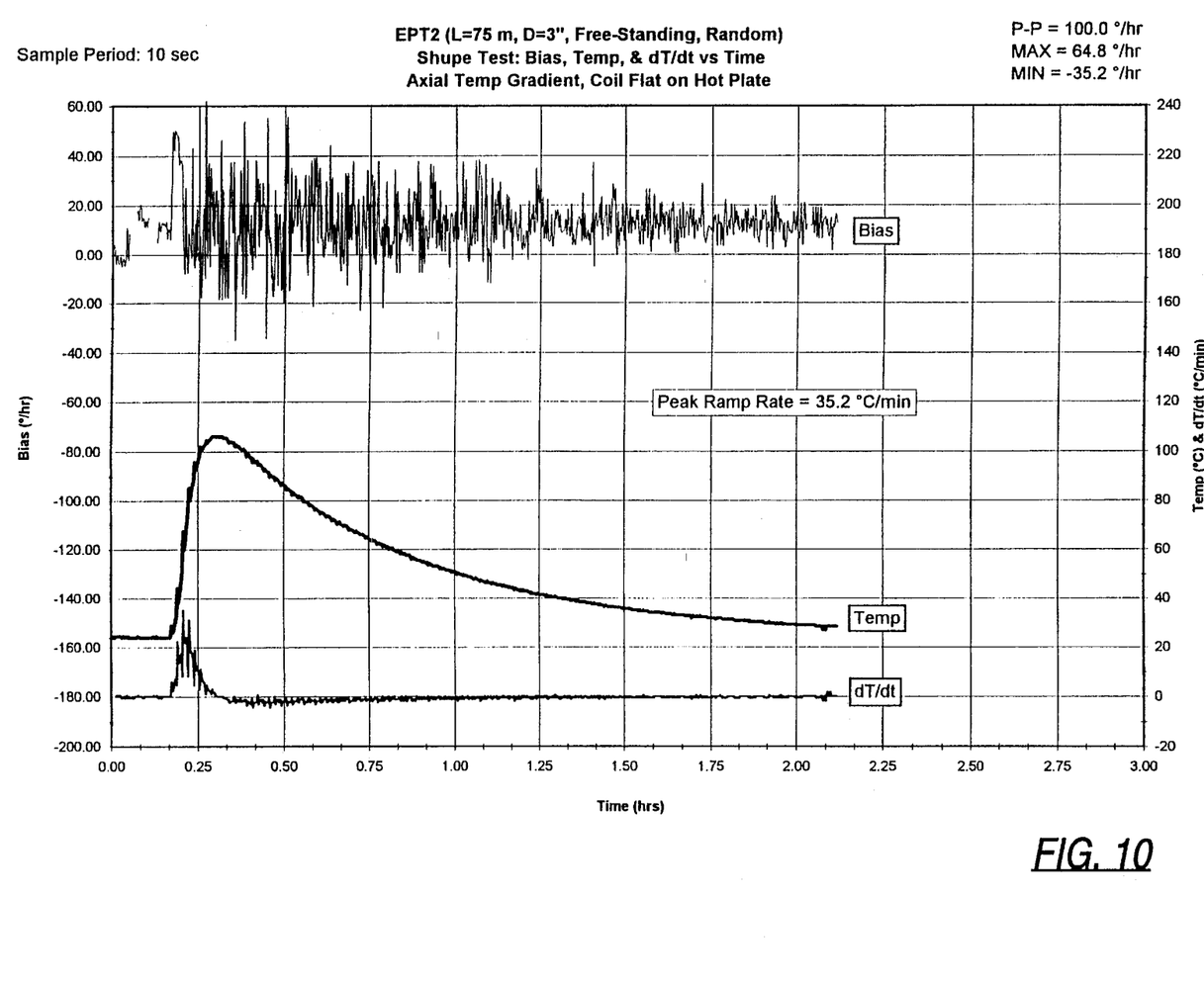
FIG. 10 is a graph of the results of a test of a fiber-optic gyro equipped with a sensing coil embodying the present invention.

The results of these comparative tests are shown in FIGS. 9 and 10. With the first coil (FIG. 9), it can be seen that the gyro output dropped sharply soon after the hot plate was turned on, indicating a rotation rate in excess of −100°/hr. However, the gyro was in fact on a stationary support. The gyro then returned to more normal operation. The peak-to-peak variations in the gyro output were 171.4°/hr. With the second coil (FIG. 10), there was no detectable swing in the gyro output, and thus no false indication of rotation. The peak-to-peak variations in the gyro output were only 100°/hr.

I claim:

1. In a fiber-optic gyro including a source of light, a coil of optical fiber having multiple turns, said coil being rotatable about an axis of sensitivity, means for optically coupling light from the source to the coil to create counter-propagating light beams within the coil, and photodetecting means receiving said counter-propagated light beams for producing an output signal indicative of the coil rotation rate, the multiple turns of said coil varying in size on both sides of the mid-point of the fiber that forms the coil, said multiple turns also being collapsed in the direction of the axis of the coil.

2. The fiber-optic gyro of claim 1 wherein the range of the variations in the sizes of said multiple turns is substantially the same on both sides of the mid-point of said fiber.

3. The fiber-optic gyro of claim 1 wherein said coil has a generally circular configuration in the transverse direction, with the diameters of the turns varying over substantially the same range on both sides of the mid-point of said fiber.

4. The fiber-optic gyro of claim 1 wherein the multiple turns of said coil are all symmetrical about a common axis of the coil.

5. The fiber-optic gyro of claim 1 wherein said coil is formed by winding an optical fiber on a bobbin that varies in diameter along its length, fiber on both sides of the mid-point being wound on portions of the bobbin that vary over substantially the same range of diameters, and then removing the resulting coil from the bobbin and collapsing the coil along its axis.

6. The fiber-optic gyro of claim 1 wherein said coil is formed of polarization-holding optic fiber.

7. The fiber-optic gyro of claim 1 in which said coil is at least partially surrounded by a gel.

8. The fiber-optic gyro of claim 7 which includes a rigid housing containing said gel with said coil therein.

9. The fiber-optic gyro of claim 7 wherein said gel is loaded with particles.

10. The fiber-optic gyro of claim 8 wherein said gel is bonded to the walls of said housing.

11. The fiber-optic gyro of claim 7 wherein said gel has a Young's modulus that is substantially constant over the operating temperature range of the gyroscope and a glass transition temperature that is below the operating temperature range of said gyroscope.

12. In a fiber-optic gyro including a source of light, a coil of optical fiber having multiple turns, said coil being rotatable about an axis of sensitivity, means for optically coupling light from the source to the coil to create counter-propagating light beams within the coil, and photodetecting means receiving said counter-propagated light beams for producing an output signal indicative of the coil rotation rate, the multiple turns of said coil being collapsed together in the direction of the axis of the coil with the coil turns formed from fiber on both sides of the mid-point of the fiber being distributed throughout the axial thickness of the coil.

13. In a fiber-optic gyro including a source of light, a coil of optical fiber having multiple turns, said coil being rotatable about an axis of sensitivity, means for optically coupling light from the source to the coil to create counter-propagating light beams within the coil, and photodetecting means receiving said counter-propagated light beams for producing an output signal indicative of the coil rotation rate, the multiple turns of said coil being collapsed together in the direction of the axis of the coil with the coil turns formed from fiber on both sides of the mid-point of the fiber being distributed throughout the radial thickness of the coil.

14. In a fiber-optic gyro including a source of light, a coil of optical fiber having multiple turns, said coil being rotatable about an axis of sensitivity, means for optically coupling light from the source to the coil to create counter-propagating light beams within the coil, and photodetecting means receiving said counter-propagated light beams for producing an output signal indicative of the coil rotation rate, the multiple turns of said coil being collapsed together in the direction of the axis of the coil with the coil turns formed from fiber on both sides of the mid-point of the fiber being distributed throughout the axial and radial thicknesses of the coil.

15. The fiber-optic gyro of claim 14 wherein said distribution of the coil turns is random.

16. The fiber-optic gyro of claim 14 wherein said coil is formed by winding a continuous length of optical fiber on a core and then removing the coil from the core and collapsing the coil axially.

17. The fiber-optic gyro of claim 14 wherein the multiple turns of said coil have varying diameters throughout the coil, and the range and distribution of different diameters is substantially the same on both sides of the mid-point of the fiber forming the coil.

18. The fiber-optic gyro of claim 17 wherein the number of coil turns of each different diameter is substantially the same on both sides of the mid-point of the fiber forming the coil.

19. In a fiber-optic gyro including a source of light, a coil of optical fiber having multiple turns, said coil being rotatable about an axis of sensitivity, means for optically coupling light from the source to the coil to create counter-propagating light beams within the coil, and photodetecting means receiving said counter-propagated light beams for producing an output signal indicative of the coil rotation rate, the improvement whereby said optical fiber coil is formed from multiple turns of optical fiber wound randomly around a common axis so that coil turns formed from fiber on opposite sides of the mid-point of the optical fiber are distributed randomly in the coil.

20. The fiber-optic gyro of claim 19 wherein said coil turns formed from fiber on opposite sides of the mid-point of the fiber are randomly distributed in the axial direction.

21. The fiber-optic gyro of claim 19 wherein said coil turns formed from fiber on opposite sides of the mid-point of the fiber are randomly distributed in the radial direction.

22. The fiber-optic gyro of claim 19 wherein said coil turns formed from fiber on opposite sides of the mid-point of the fiber are randomly distributed in both the axial and radial directions.

23. The fiber-optic gyro of claim 19 wherein the multiple turns of said coil have randomly varying diameters throughout the coil.

24. In a fiber-optic gyro including a source of light, a coil of optical fiber having a plurality of turns, said coil being rotatable about an axis of sensitivity, means for optically coupling light from the source to the coil to create counter-propagating light beams within the coil, and photodetecting means receiving said counter-propagated light beams for producing an output signal indicative of the coil rotation rate, the turns of said coil being randomly distributed throughout the coil so that thermal gradients traversing the coil have a similar effect on coil turns formed from fiber on both sides of the mid-point of the total length of fiber forming the coil.

25. A method of forming a sensing coil for a fiber-optic gyro, said method comprising winding multiple layers of a continuous length of optical fiber randomly around a core so that the coil turns vary in size on both sides of the mid-point of the optical fiber, and removing the resulting coil from the core and axially collapsing the coil.

26. The method of claim 25 wherein said coil turns formed from fiber on opposite sides of the mid-point of the fiber are randomly distributed in the axial direction.

27. The method of claim 25 wherein said coil turns formed from fiber on opposite sides of the mid-point of the fiber are randomly distributed in the radial direction.

28. The method of claim 25 wherein said coil turns formed from fiber on opposite sides of the mid-point of the fiber are randomly distributed in both the axial and radial directions.

29. The method of claim 25 wherein the multiple turns of said coil have randomly varying diameters throughout the coil.

30. The method of claim 25 wherein said core varies in diameter along its length.

31. The method of claim 25 wherein said core is collapsible in the radial direction, and said core is collapsed after said coil has been wound thereon to permit the removal of said coil.

32. The method of claim 25 wherein said core varies in diameter along its length, and the fiber on both sides of said mid-point are wound on portions of said core that vary over substantially the same range of diameters.

33. The method of claim 25 wherein said fiber is polarization-holding fiber.

34. A method of forming a sensing coil for a fiber-optic gyro, said method comprising winding multiple layers of a continuous length of optical fiber around a conical core, and removing the resulting multi-layer coil from the conical core and collapsing the coil in the axial direction.

35. The method of claim 34 wherein the winding point is moved back and forth in the longitudinal direction along the surface of said conical core in a random fashion during the winding of said coil, so that coil turns formed from fiber on opposite sides of the mid-point of the fiber are distributed randomly throughout the coil in the axial direction.

36. The method of claim 34 wherein the angle between the axis of said conical core and the conical surface of the core is between about 40° and about 80°.

* * * * *